United States Patent [19]
Gellert

[11] Patent Number: 5,366,370
[45] Date of Patent: Nov. 22, 1994

[54] INJECTION MOLDING APPARATUS WITH PERPENDICULAR HOT TIP GATES

[76] Inventor: Jobst U. Gellert, 7A Prince Street, Georgetown, Ontario, Canada, L7G 2X1

[21] Appl. No.: 170,827

[22] Filed: Dec. 21, 1993

[51] Int. Cl.⁵ .............................................. B29C 45/22
[52] U.S. Cl. .................................. 425/549; 264/297.2; 264/328.8; 264/328.15; 425/570; 425/572
[58] Field of Search ............... 425/549, 568, 570, 572; 264/297.2, 328.8, 328.12, 328.15

[56] References Cited
U.S. PATENT DOCUMENTS

| | | | |
|---|---|---|---|
| 4,344,750 | 8/1982 | Gellert | 425/549 |
| 4,768,945 | 9/1988 | Schmidt et al. | 425/549 |
| 5,217,730 | 6/1993 | Teng | 425/549 |

OTHER PUBLICATIONS

1979-Plastverarbeiter-FIG. 28, vol. 30, No. 2-pp. 83-88.
Mold-Masters Limited Brochure-E-CMSSN-11-1990 "Injection Molding with Compact Master-Shot"-p. 7.

*Primary Examiner*—Tim Heitbrink
*Attorney, Agent, or Firm*—Dalesman & Company

[57] ABSTRACT

Multi-cavity injection molding apparatus with hot tip gates extending perpendicular to the direction of mold opening to provide very clean shearing action. The heated nozzles extend diagonally outward in two rows from a pair of diagonal surfaces extending along an elongated melt distribution manifold. Each nozzle has a pointed tip extending outwardly at an angle to its longitudinal axis in alignment with one of the gates. The outward angles of the nozzles themselves and their pointed tips enable the gates to be oriented parallel to the parting line and perpendicular to the direction of mold opening.

3 Claims, 2 Drawing Sheets

INJECTION MOLDING APPARATUS WITH PERPENDICULAR HOT TIP GATES

BACKGROUND OF THE INVENTION

This invention relates generally to injection molding and more particularly to apparatus wherein nozzles extend diagonally from an elongated manifold to convey melt to gates extending parallel to the parting line.

Injection molding simultaneously through a number of gates to a number of different cavities is well known in the art and is referred to as multi-cavity molding. It is well known to do this using a number of hot tip gated nozzles to convey melt out from a common melt distribution manifold or using a single edge gated nozzle to convey melt to a number of surrounding gates. Examples of edge gated nozzles are shown in the applicants' U.S. Pat. No. 4,344,750 which issued Aug. 17, 1982 and in FIG. 4 of U.S. Pat. No. 5,217,730 to Teng which issued Jun. 8, 1993. These configurations have the advantage that the gates extend parallel to the parting line or perpendicular to the direction of mold opening and thus provide very clean shearing at the gate when the parts are demolded from the cavities. However, in addition to not being hot tip gated, they have the serious disadvantage for many larger cavity applications that the gates must be located relatively close together around the single nozzle between them. This space restriction limits the extent and location of cooling which can be provided adjacent the cavities which is important for fast cycles. It also limits the position of the gate on the cavity which is important in other situations to avoid undue core shift.

An example of a number of hot tip gated nozzles extending out from a common melt distribution manifold is shown in U.S. Pat. No. 4,768,945 to Schmidt et al. which issued Sep. 6, 1988. While avoiding the above disadvantages of edge gating, this configuration has the disadvantage that the hot tip gates cannot be oriented to extend to a portion of the cavity wall which is perpendicular to the parting line to produce the shearing effect of edge gating. An example of nozzles extending diagonally outwardly from a common manifold is shown in FIG. 28 of Plastverarbeiter Volume 30 Number 2, 1979 pages 83–88 but it similarly has the disadvantage that the gates cannot extend parallel to the parting line and must be positioned at an angled portion of the cavity wall. Page 7 of Mold-Masters Limited Brochure E-CMSSN-11-90 Injection Molding with Compact Master-Shot shows nozzles for both angled hot tip gating and angled edge gating. However, none of the prior art shows the combined advantages of hot tip gating and shearing at the gates provided by the gates being oriented perpendicular to the direction of opening of the mold.

SUMMARY OF THE INVENTION

According, it is an object of the present invention to at least partially overcome the disadvantages of the prior art by providing injection molding apparatus for multi-cavity hot tip gating with the gates extending substantially parallel to the parting line.

To this end, in one of its aspects, the invention provides an injection molding apparatus having a plurality of heated nozzles extending from a common elongated manifold with a melt passage inlet to convey melt from the melt passage inlet to a plurality of gates, each gate extending through a mold to a separate cavity extending from a common parting line, the parting line extending substantially perpendicular to the melt passage inlet, each nozzle being seated in a well in the mold and having a longitudinal axis, a rear end abutting against the manifold, and a pointed tip aligned with a respective one of the gates, having the improvement wherein the gates extend substantially parallel to the parting line, the manifold has at least one longitudinally extending diagonal surface against which the rear ends of the nozzles abut, whereby each nozzle extends forwardly and outwardly from the manifold at a first predetermined angle to the parting line, the pointed tip of each nozzle extending outwardly at a second predetermined angle to the longitudinal axis of the nozzle whereby the pointed tip is aligned with the respective one of the gates in a direction substantially parallel to the parting line.

Further objects and advantages of the invention will appear from the following description taken together with the accompanying drawings.

DETAILED DESCRIPTION OF THE INVENTION

Figure 1:
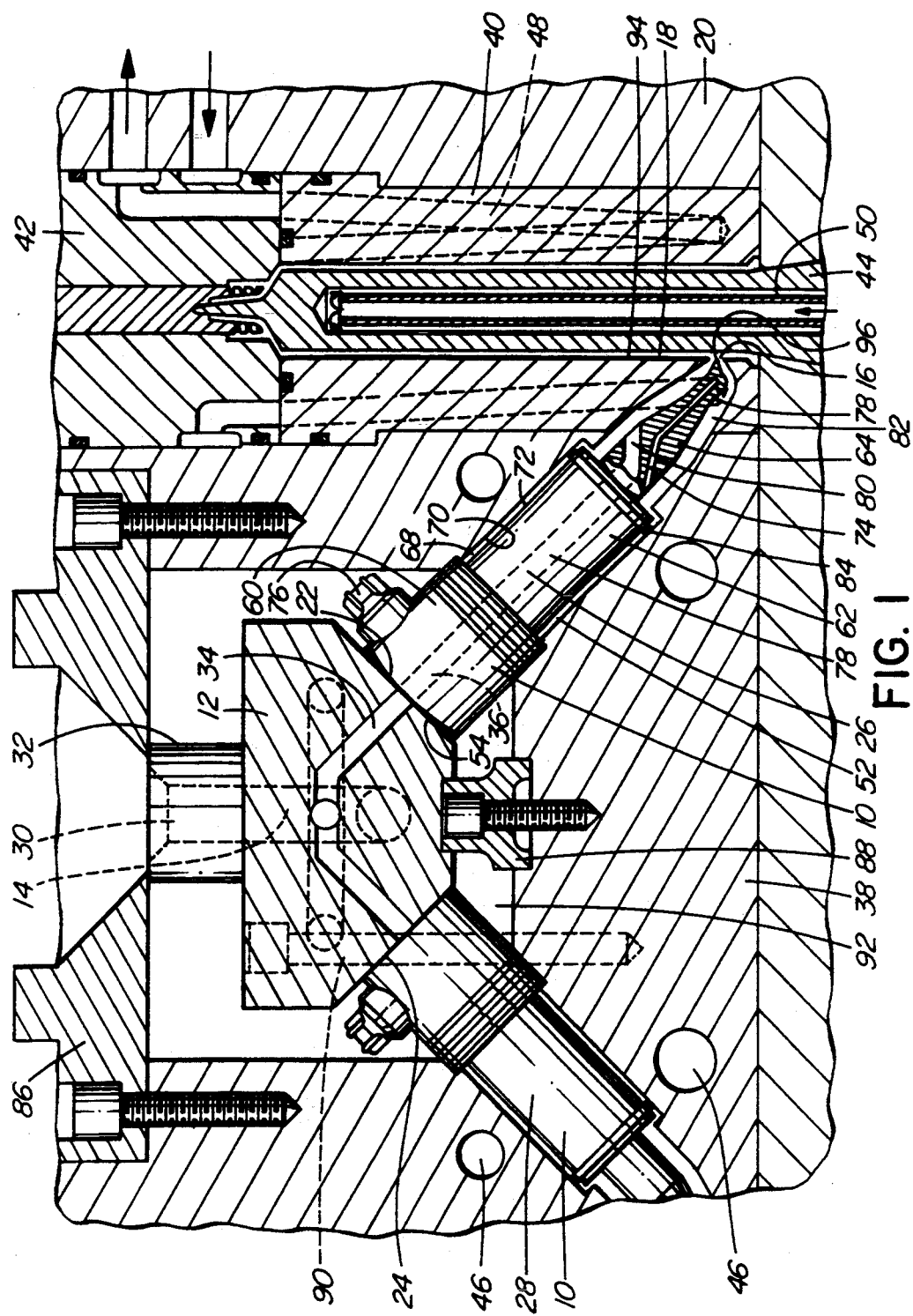
FIG. 1 is a partial sectional view of a portion of a multi-cavity injection molding system showing apparatus according to a preferred embodiment of the invention.

Reference is first made to FIG. 1 which shows a portion of a multi-cavity injection molding system or apparatus having several steel nozzles 10 extending from a melt distribution manifold 12 to convey pressurized plastic melt through a melt passage 14 to respective gates leading to different cavities 18 in the mold 20. The melt distribution manifold 12 has a suitable elongated shape with a pair of diagonal surfaces 22, 24 extending longitudinally along it. While only two nozzles 10 are seen, there are several nozzles spaced in a row 26, 28 along each of the diagonal surfaces 22, 24. The melt passage 14 extends from a common inlet 30 in an inlet portion 32 of the melt distribution manifold 12 and branches in the manifold 12 to a separate arm 34 which extends in alignment with a melt bore 36 extending through each of the nozzles 10.

For ease of illustration, the mold 20 is shown including only a nozzle and cavity retainer plate 38, cavity insert 40, cavity insert retainer plate 42, and core insert 44. Other molds may include a variety of additional plates or parts depending upon the application. The nozzle and cavity retainer plate 38 is cooled by pumping cooling water through cooling channels 46. Cooling is provided around each cavity 18 by pumping cooling water through a cooling conduit 48 with alternate portions extending forwardly and rearwardly on an angle to form a cooling circuit around the cavity 18. Cooling is also provided by cooling water flowing through a central cooling tube 50 extending in the core insert 44.

Figure 2:
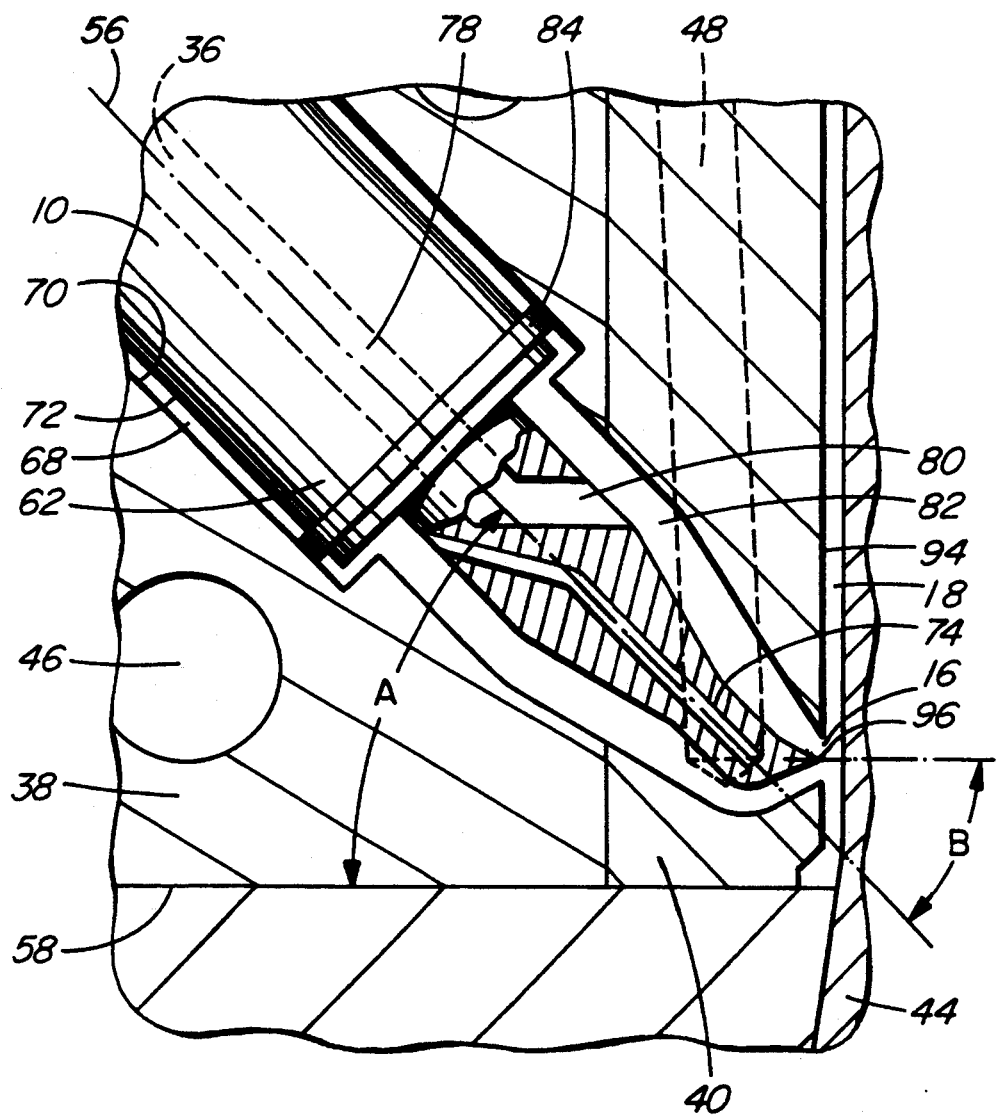
FIG. 2 is an enlarged sectional view of a portion of FIG. 1 showing angles A and B.

Each nozzle 10 is seated in an opening 52 in the nozzle plate 38 with its rear end 54 abutting against one of the diagonal surfaces 22, 24 running along the elongated manifold 12. As best seen in FIG. 2, the nozzles 10 extend forwardly and outwardly from the manifold 12 with a longitudinal axis 56 extending at the same angle A to the common parting line 58 between the cavities 18 as the diagonal surfaces 22, 24 face. In this embodiment, the angle A is substantially 45°, although in other embodiments the nozzles 10 can extend diagonally on some other suitable angle as described further below. Each nozzle 10 has a rear collar portion 60, a central cylindrical locating and sealing flange 62, and a forward nose portion 64. The locating and sealing flange 62 seals and locates in the opening 52 with an insulative air space 68 between the angled inner surface 70 of the opening 52 and the outer surface 72 of the locating flange 62. The insulative air space 68 ensures there is sufficient thermal separation between the cooled nozzle and cavity retainer plate 38 and the nozzle 10 which is heated by an integral electrical heating element 74. The heating element 74 extends around the melt bore 36 from an external terminal 76 near the rear end 54 and has a forward end 78 which extends centrally into the forward nose portion 64 of the nozzle 10. The melt bore 36 through the nozzle 10 has a central portion 78 which extends forwardly from the rear end 54 and a diagonal portion 80 which extends outwardly to a space 82 surrounding the forward nose portion 64. The locating and sealing flange 62 has a seal 84 which fits against the angled inner surface 70 of the opening 52 to prevent pressurized melt escaping from the space 82 around the forward nose portion 64 into the insulative air space 68 around the locating and sealing flange 62. The nozzles 10 are secured in place in the openings 52 in the nozzle and cavity retainer plate 38 by the elongated manifold 12. The manifold 12 is, in turn, held securely in place between a retaining plate 86 and a locating ring 88 by mounting screws 90. Thus, the melt distribution manifold 12 which can be heated by an integral electrical heating element (not shown) is mounted with an insulative air space 92 extending between it and the adjacent cooled nozzle and cavity retainer plate 38.

The parting line 58 extends perpendicularly to the common inlet 30 in the inlet portion 32 of the manifold and the mold opens in a direction perpendicular to the parting line 58. Although the walls 94 of the cavities 18 are also shown extending perpendicularly to the parting line 58, it is well known in the art that they must extend at a draft angle of from 0.5° to 5° from perpendicular to facilitate demolding from the cavities 18. While this draft has been disregarded to facilitate the following discussion, in actual fact it is well known that allowance must be made for it in determining the actual orientation of the cavity walls 94 and gates 16. The forward nose portion 64 of each nozzle 10 has a pointed tip 96 which extends in alignment with one of the gates 16. As best seen in FIG. 2, the pointed tip 96 extends outwardly at an angle B to the longitudinal axis 56 of the nozzle 10. In this embodiment, the angle B is substantially 45° which is the same as angle A at which the longitudinal axis 56 of the nozzle 10 extends to provide that the pointed tips 96 and gates 16 extend in a direction substantially parallel to the parting line 58. The gates 16 extend perpendicular to the cavity wall 94 so the term "substantially parallel" is defined herein as allowing or providing for the required small draft angle referred to above. If the diagonal surfaces 22, 24 of the manifold 12 are shaped so the rows of nozzles 10 extend outwardly with angle A 40° then the angle B at which the pointed tips 96 extend also has to be 40° to result in the pointed tips 96 and gates 16 extending substantially parallel to the parting line 58. As mentioned above, this has the advantage that the gates 16 extend substantially perpendicular to the direction of mold opening which produces very clean shearing at the gates 16.

In use, the injection molding system or apparatus is assembled as shown in FIGS. 1 and 2. Electrical power is applied to the heating element in the manifold 12 and to the heating elements 74 in the nozzles 10 to heat them to a predetermined operating temperature. Pressurized melt applied from a molding machine (not shown) to the common inlet 30 to the melt passage 14 according to a predetermined molding cycle. The melt flows from the melt distribution manifold 12 through the nozzles 10 and gates 16 into the cavities 18. After the cavities 18 are filled and a suitable packing and cooling period has expired, injection pressure is released and the melt conveying system is decompressed to avoid possible stringing through the open gates 16. The mold 20 is then opened to demold the molded products. As described above, the orientation of the gates 16 substantially perpendicular to the direction of opening ensures very clean shearing at the gates 16 in line with the cavity wall 94. After demolding, the mold 20 is closed and the cycle repeated continuously with a cycle time dependent upon the size of the cavities 18 and the type of material being molded.

While the description of the injection molding apparatus according to the invention has been given with respect to a preferred embodiment, it will be evident that various other modifications are possible without departing from the scope of the invention as understood by those skilled in the art and as defined in the following claims.

The embodiments of the invention in which an exclusive property or privilege is claimed are defined as follows:

1. In an injection molding apparatus having a plurality of heated nozzles extending from a common elongated manifold with a melt passage inlet to convey melt from the melt passage inlet to a plurality of gates, each gaze extending through a mold to a separate cavity extending from a common parting line, the parting line extending substantially perpendicular to the melt passage inlet, each nozzle being seated in a well in the mold and having a longitudinal axis, a rear end abutting against the manifold, and a pointed tip aligned with a respective one of the gates, having the improvement wherein;

the gates extend substantially parallel to the parting line, the manifold has at least one longitudinally extending diagonal surface against which the rear ends of the nozzles abut, whereby each nozzle extends forwardly and outwardly from the manifold at a first predetermined angle to the parting line, the pointed tip of each nozzle extending outwardly at a second predetermined angle to the longitudinal axis of the nozzle, whereby the pointed tip is aligned with the respective one of the gates in a direction substantially parallel to the parting line.

2. Injection molding apparatus as claimed in claim 1 wherein the manifold has a pair of longitudinally extending diagonal surfaces, each diagonal surface facing forwardly and in opposite directions outwardly at the first predetermined angle to the parting line, the nozzles being spaced along both of the diagonal surfaces in two rows extending forwardly and in opposite directions outwardly at the first predetermined angle to the parting line.

3. Injection molding apparatus as claimed in claim 2 wherein the first predetermined angle at which each nozzle extends to the parting line is substantially 45° and the second predetermined angle at which the pointed tip of each nozzle extends outwardly to the longitudinal axis of the nozzle is substantially 45°.

* * * * *